United States Patent
Hasegawa et al.

(10) Patent No.: US 7,957,165 B2
(45) Date of Patent: Jun. 7, 2011

(54) DC-DC CONVERTER WITH A PLURALITY OF SOFT-START CONTROL CIRCUITS

(75) Inventors: Morihito Hasegawa, Kasugai (JP); Hidekiyo Ozawa, Kasugai (JP)

(73) Assignee: Fujitsu Semiconductor Limited, Yokohama (JP)

( * ) Notice: Subject to any disclaimer, the term of this patent is extended or adjusted under 35 U.S.C. 154(b) by 664 days.

(21) Appl. No.: 12/032,016

(22) Filed: Feb. 15, 2008

(65) Prior Publication Data

US 2008/0197821 A1 Aug. 21, 2008

(30) Foreign Application Priority Data

Feb. 16, 2007 (JP) ................... 2007-035988

(51) Int. Cl.
*H02M 1/36* (2007.01)
(52) U.S. Cl. .................. 363/49; 323/285; 323/901
(58) Field of Classification Search .............. 363/49; 323/908, 285, 288, 238, 321, 901
See application file for complete search history.

(56) References Cited

U.S. PATENT DOCUMENTS

| 7,075,804 B2 * | 7/2006 | Shearon et al. ............ 363/49 |
| 7,180,757 B2 * | 2/2007 | Chen et al. .............. 363/49 |
| 2006/0170290 A1 * | 8/2006 | Miyagoe ................ 307/82 |

FOREIGN PATENT DOCUMENTS

| JP | 09-154275 A | 6/1997 |
| JP | 10-323026 A | 12/1998 |
| JP | 2005-304279 A | 10/2005 |
| JP | 2005-323413 A | 11/2005 |
| JP | 2005-354845 A | 12/2005 |
| JP | 2006-109535 A | 4/2006 |

* cited by examiner

*Primary Examiner* — Harry Behm
(74) *Attorney, Agent, or Firm* — Arent Fox LLP

(57) ABSTRACT

A DC-DC conversion circuit is configured by including a plurality of control signal generation circuits, a plurality of soft-start control circuits, and a start control circuit. The plurality of control signal generation circuits correspond to the plurality of control signals, and generate a corresponding control signal of the plurality of control signals based on a corresponding output value of a plurality of output values. The plurality of soft-start control circuits correspond to the plurality of control signals, and control a variation of the corresponding control signal at a start time of the DC-DC conversion circuit. The start control circuit instructs the corresponding soft-start control circuit to start operation in accordance with a change of the control signal taking part in an output control at the start time of the DC-DC conversion circuit.

8 Claims, 8 Drawing Sheets

DC-DC CONVERTER WITH A PLURALITY OF SOFT-START CONTROL CIRCUITS

CROSS REFERENCE TO RELATED APPLICATION

This application is based upon and claims the benefit of priority from Japanese Patent Application No. 2007-035988, filed on Feb. 16, 2007, the entire contents of which are incorporated herein by reference.

BACKGROUND

1. Field

The embodiment relates to a DC-DC conversion circuit, a DC-DC conversion control circuit, and a DC-DC conversion control method.

2. Description of the Related Art

In a portable electronics device such as a notebook personal computer, a secondary battery is used as a power supply. In general, a voltage supplied by the secondary battery decreases as a discharge of the secondary battery advances, and therefore, a power supply circuit using a DC-DC converter (DC-DC conversion circuit) is mounted so as to keep the voltage used inside the portable electronics device constant. Besides, in the portable electronics device, a charging circuit using the DC-DC converter is also mounted so that the secondary battery can be charged easily by connecting an external power supply via an AC adapter and so on. It is general that the portable electronics device is driven by using a power supply of the secondary battery when the external power supply is not connected, and driven by using the power supply of the external power supply when the external power supply is connected.

In the DC-DC converter, it is very important to prevent an inrush current at a start time of the DC-DC converter. For example, in a DC-DC converter in a PWM control method, a method is known in which the inrush current is prevented by forcibly reducing a pulse width of a control signal turning on/off a switching element by using a dead time control circuit, and then increasing the pulse width gradually in accordance with a passage of time at the start time of the DC-DC converter. In addition to the above, a method is also known in which the inrush current is prevented by an output slope control increasing an output voltage of the DC-DC converter gradually from "0" (zero) V at the start time of the DC-DC converter.

FIG. 1 shows an example of a DC-DC converter. A DC-DC converter CNV is configured as a constant-voltage control type DC-DC converter, and has a main switching transistor T1, a synchronous rectification transistor T2, a choke coil L1, a smoothing capacitor C1, a soft-start capacitor CS1, and a control circuit CTL. The main switching transistor T1 is configured by an n-type transistor. An input pin of the main switching transistor T1 is connected to an input pin P1 receiving an input voltage V1. An output pin of the main switching transistor T1 is connected to one end of the choke coil L1. A control pin of the main switching transistor T1 receives an output signal QP of a PWM comparator PCMP in the control circuit CTL.

The synchronous rectification transistor T2 is configured by an n-type transistor. An input pin of the synchronous rectification transistor T2 is connected to a ground line. An output pin of the synchronous rectification transistor T2 is connected to one end of the choke coil L1. A control pin of the synchronous rectification transistor T2 receives an output signal /QP of the PWM comparator PCMP in the control circuit CTL. The other end of the choke coil L1 is connected to an output pin P2 supplying an output voltage Vo. The smoothing capacitor C1 is provided to smooth the output voltage Vo, and connected between the output pin P2 and the ground line. One end of the soft-start capacitor CS1 is connected to a second non-inverting input pin between a first and second non-inverting input pins of an error amplifier ERA1 in the control circuit CTL. The other end of the soft-start capacitor CS1 is connected to a ground line.

The control circuit CTL is configured by including a constant-current circuit I1, switch circuits SW1A, SW1B, a discharging resistor RD1, resistors R1, R2, a voltage generator E1, the error amplifier ERA1, a triangular wave oscillator OSC, and the PWM comparator PCMP. The constant-current circuit I1 and the switch circuit SW1A are connected in series between a supply line of a power supply voltage Vh and one end of the soft-start capacitor CS1 (the second non-inverting input pin of the error amplifier ERA1). The switch circuit SW1B and the discharge resistor RD1 are connected in series between one end of the soft-start capacitor CS1 (the second non-inverting input pin of the error amplifier ERA1) and the ground line. The switch circuit SW1A turns on-state in response to a start request of the DC-DC converter CNV, and turns off-state in response to a stop request of the DC-DC converter CNV. The switch circuit SW1B turns on-state in response to the stop request of the DC-DC converter CNV, and turns off-state in response to the start request of the DC-DC converter CNV. The resistors R1, R2 are connected in series between the output pin P2 and the ground line. The voltage generator E1 generates a reference voltage Ve1.

The error amplifier ERA1 amplifies a voltage difference between a lower voltage between the voltage of the first non-inverting input pin and the voltage of the second non-inverting input pin, and a voltage of an inverting input pin, to generate an output signal DF1. The error amplifier ERA1 receives the reference voltage Ve1 at the first non-inverting input pin, receives a voltage Vs1 (a voltage of a connection node of the switch circuits SW1A, SW1B) generated by the soft-start capacitor CS1 at the second non-inverting input pin, and receives a voltage Vd (a voltage of a connection node of the resistors R1, R2) dividing the output voltage Vo by the resistors R1, R2 at the inverting input pin. Accordingly, the error amplifier ERA1 generates the output signal DF1 by amplifying the voltage difference between the voltage Vs1 and the voltage Vd when the voltage Vs1 is lower than the reference voltage Ve1, and generates the output signal DF1 by amplifying the voltage difference between the reference voltage Ve1 and the voltage Vd when the voltage Vs1 is higher than the reference voltage Ve1. The triangular wave oscillator OSC generates a triangular wave signal TW having a predetermined cycle. For example, a minimum value of a voltage of the triangular wave signal TW is 1.0 V, and a maximum value of the voltage of the triangular wave signal TW is 2.0 V.

The PWM comparator PCMP is a voltage-pulse width converter comparing the voltage of a non-inverting input pin and the voltage of an inverting input pin, setting the output signal QP (/QP) at a high level (low level) when the voltage of the inverting input pin is lower, and setting the output signal QP (/QP) at a low level (high level) when the voltage of the inverting input pin is higher. The PWM comparator PCMP receives the output signal DF1 of the error amplifier ERA1 at the non-inverting input pin, and receives the triangular wave signal TW at the inverting input pin. Accordingly, the PWM comparator PCMP sets the output signal QP at the high level when the voltage of the output signal DF1 of the error amplifier ERA1 is higher than the voltage of the triangular wave signal TW, and sets the output signal QP at the low level when the voltage of the output signal DF1 of the error amplifier ERA1 is lower than the voltage of the triangular wave signal TW.

In the DC-DC converter CNV having the constitution as stated above, when the main switching transistor T1 turns on-state, the synchronous rectification transistor T2 turns off-state, and a current is supplied to a load from an input side via the choice coil L1. A voltage difference between an input voltage Vi and the output voltage Vo is applied to both ends of the choke coil L1, and therefore, the current flowing in the choke coil L1 increases in accordance with the passage of time and the current supplied to the load also increases in accordance with the passage of time. Besides, the current flows in the choke coil L1, and thereby, energy is accumulated at the choke coil L1. When the main switching transistor T1 turns off-state, the synchronous rectification transistor T2 turns on-state, and the energy accumulated at the choke coil L1 is discharged. At this time, the output voltage Vo is represented by an expression (1) using an on-term Ton of the main switching transistor T1, an off-term Toff of the main switching transistor T1, and the input voltage Vi.

$$Vo = \{Ton/(Ton+Toff)\} \times Vi \quad (1)$$

Besides, the current flowing in the choke coil L1 flows from the input side to the output side during the on-term of the main switching transistor T1, and it is supplied via the synchronous rectification transistor T2 during the off-term of the main switching transistor T1. Accordingly, an average input current Ii is represented by an expression (2) using the on-term Ton of the main switching transistor T1, the off-term Toff of the main switching transistor T1, and an output current Io.

$$Ii = \{Ton/(Ton+Toff)\} \times Io \quad (2)$$

Consequently, when the output voltage Vo varies resulting from a variation of the input voltage Vi, it is possible to keep the output voltage Vo constant by detecting the variation of the output voltage Vo, and controlling a ratio of the on-term/off-term of the main switching transistor T1. Similarly, when the output voltage Vo varies resulting from a variation of the load, it is possible to keep the output voltage Vo constant by detecting the variation of the output voltage Vo, and controlling the ratio of the on-term/off-term of the main switching transistor T1.

FIG. 2 shows operations of the PWM comparator in FIG. 1. The PWM comparator PCMP sets the output signal QP at the high level when the voltage of the output signal DF1 of the error amplifier ERA1 is higher than the voltage of the triangular wave signal TW, and sets the output signal QP at the low level when the voltage of the output signal DF1 of the error amplifier ERA1 is lower than the voltage of the triangular wave signal TW. Accordingly, when the voltage of the output signal DF1 of the error amplifier ERA1 becomes low, the pulse width (high-level period) of the output signal QP of the PWM comparator PCMP becomes small, and when the voltage of the output signal DF1 of the error amplifier ERA1 becomes high, the pulse width of the output signal QP of the PWM comparator PCMP becomes large. As stated above, the PWM comparator PCMP generates the output signal QP with the pulse width in proportion to the voltage of the output signal DF1 of the error amplifier ERA1.

Consequently, during the period when the voltage Vs1 generated by the soft-start capacitor CS1 is higher than the reference voltage Ve1, the voltage difference between the reference voltage Ve1 and the voltage Vd (the voltage dividing the output voltage Vo by the resistors R1, R2) becomes large and the voltage of the output signal DF1 of the error amplifier ERA1 becomes high, when the output voltage Vo becomes low. As a result, the pulse width of the output signal QP of the PWM comparator PCMP becomes large, and the on-term of the main switching transistor T1 becomes long. On the other hand, when the output voltage Vo becomes high, the voltage difference between the reference voltage Ve1 and the voltage Vd becomes small, and the voltage of the output signal DF1 of the error amplifier ERA1 becomes low. As a result, the pulse width of the output signal QP of the PWM comparator PCMP becomes small, and the on-term of the main switching transistor T1 becomes short. As stated above, in the DC-DC converter CNV in the PWM control method, it is possible to control the output voltage Vo by controlling the ratio of the on-term/off-term of the main switching transistor T1.

Incidentally, the output voltage Vo is "0" (zero) V at a start time of the DC-DC converter CNV, and therefore, the voltage difference between the input voltage Vi and the output voltage Vo becomes maximum, and the voltage of the output signal DF1 of the error amplifier ERA1 also becomes maximum when it is assumed that the voltage of the first non-inverting input pin is lower than the voltage of the second non-inverting input pin at the error amplifier ERA1. In this case, the pulse width of the output signal QP of the PWM comparator PCMP becomes maximum, and the on-term of the main switching transistor T1 becomes maximum. Besides, a maximum current Ipeak flowing in the choke coil L1 is represented by an expression (3) using the input voltage Vi, the output voltage Vo, an inductance L of the choke coil L1, and the on-term Ton of the main switching transistor T1.

$$Ipeak = \{(Vi-Vo)/L\} \times Ton \quad (3)$$

The output voltage Vo is "0" (zero) V at the start time of the DC-DC converter CNV, and therefore, the voltage applied to the choke coil L1 becomes maximum, and the on-term of the main switching transistor T1 becomes maximum. As a result, it can be seen that excessive inrush currents are generated at the choke coil L1 and the main switching transistor T1. The excessive inrush current is generated because the DC-DC converter CNV tries to increase the output voltage Vo from "0" (zero) V to a rated value (for example, 3.3 V) at one stroke.

However, at the start time of the DC-DC converter CNV, the soft-start capacitor CS1 is charged by the constant-current circuit I1, and thereby, the voltage Vs1 (the voltage of the second non-inverting input pin of the error amplifier ERA1) generated by the soft-start capacitor CS1 increases gradually from "0" (zero) V. Accordingly, at the start time of the DC-DC converter CNV, the error amplifier ERA1 generates the output signal DF1 by amplifying the voltage difference between the voltage Vs1 generated by the soft-start capacitor CS1 and the voltage Vd dividing the output voltage Vo by the resistors R1, R2. At the start time of the DC-DC converter CNV, the output voltage Vo is "0" (zero) V, and therefore, the voltage of the output signal DF1 of the error amplifier ERA1 becomes minimum, and the pulse width of the output signal QP of the PWM comparator PCMP also becomes minimum. Accordingly, the on-term of the main switching transistor T1 becomes minimum, and thereby, the inrush current is prevented.

Besides, the voltage Vs1 generated by the soft-start capacitor CS1 is a voltage defining the output voltage Vo, and increases gradually owing to the constant-current circuit I1 while talking a definite period of time. Accordingly, the output voltage Vo increases in proportion to the voltage Vs1. Consequently, a rising slope of the output voltage Vo is defined by a rising slope of the voltage Vs1. When the voltage Vs1 increases to be higher than the reference voltage Ve1, the error amplifier ERA1 generates the output signal DF1 by amplifying the voltage difference between the reference voltage Ve1 and the voltage Vd. Consequently, after the voltage Vs1 reaches the reference voltage Ve1, the output voltage Vo is defined by the reference voltage Ve1. Incidentally, at a stop time of the DC-DC converter CNV, the soft-start capacitor CS1 is discharged via the discharge resistor RD1, the voltage Vs1 generated by the soft-start capacitor CS1 decreases gradually, and therefore, it is possible to decrease the output voltage Vo gradually.

FIG. 3 shows an appearance of a rising/falling of the output voltage in the DC-DC converter in FIG. 1. When the DC-DC converter CNV is started at time t1, the soft-start capacitor CS1 is charged by the constant-current circuit I1 because the switch circuit SW1A turns on-state and the switch circuit SW1B turns off-state. As a result, the voltage Vs1 generated by the soft-start capacitor CS1 increases gradually in accordance with the passage of time. Accordingly, the output voltage Vo also increases gradually in accordance with the passage of time. When the voltage Vs1 reaches the reference voltage Ve1 at time t2, the output voltage Vo reaches the rated value (3.3 V), and after that, the output voltage Vo is kept constant controlled by the reference voltage Ve1.

When the DC-DC converter CNV is stopped at time t3, the soft-start capacitor CS1 is discharged by the discharge resistor RD1 because the switch circuit SW1A turns off-state and the switch circuit SW1B turns on-state. As a result, the voltage Vs1 generated by the soft-start capacitor CS1 decreases gradually in accordance with the passage of time. Accordingly, the output voltage Vo also decreases gradually in accordance with the passage of time. When the voltage Vs1 reaches "0" (zero) V at time t4, the output voltage Vo also reaches "0" (zero) V, and all of the circuits in the DC-DC converter CNV terminates the operations at the time when the output voltage Vo becomes "0" (zero) V.

As stated above, several methods are known preventing the inrush current of the DC-DC converter, but these methods are for a DC-DC converter of which output is controlled by a single control signal such as a constant-voltage control type DC-DC converter and a constant-current control type DC-DC converter. There exists a DC-DC converter of which output is controlled by a plurality of control signals such as a constant-voltage/constant-current control type DC-DC converter usually used as a charging circuit of a secondary battery (a lithium ion secondary battery and so on) among the DC-DC converters.

When a load is a passive load, an output current in proportion to an output voltage and in inverse proportion to a load impedance flows in the constant-voltage/constant-current control type DC-DC converter, when the DC-DC converter starts the operation and the output voltage is generated. On the other hand, when the load is an active load (for example, the secondary battery), the output current does not flow immediately even if the DC-DC converter starts the operation and the output voltage is generated. The output current is "0" (zero) A until the output voltage becomes higher than a voltage of the load, and the output current begins to flow when the output voltage becomes higher than the voltage of the load. When the constant-voltage/constant-current control type DC-DC converter is used as the charging circuit of the secondary battery, there has been a problem that an uncontrolled state exists and an inrush current is generated because it takes a long time before the control signals taking part in an output control are switched (a large-and-small relation between the voltage of the control signal for the output voltage and the voltage of the control signal for the output current is replaced).

Incidentally, as prior arts, for example, Japanese Unexamined Patent Application Publication No. Hei 9-154275, Japanese Unexamined Patent Application Publication No. Hei 10-323026, Japanese Unexamined Patent Application Publication No. 2005-354845, Japanese Unexamined Patent Application Publication No. 2005-323413, and Japanese Unexamined Patent Application Publication No. 2005-304279 can be cited.

SUMMARY

The embodiments provide that a DC-DC conversion circuit of which output is controlled by a plurality of control signals including a plurality of control signal generation circuits each of which corresponds to each of the plurality of control signals, and each of which generates a corresponding control signal of the plurality of control signals based on a corresponding output value of a plurality of output values, a plurality of soft-start control circuits each of which corresponds to each of the plurality of control signals, and each of which controls a variation of the corresponding control signal of the plurality of control signals at a start time of the DC-DC conversion circuit, and a start control circuit instructing the corresponding soft-start control circuit to start operation in accordance with a change of a control signal taking part in an output control at the start time of the DC-DC conversion circuit.

DETAILED DESCRIPTION OF THE EMBODIMENTS

Hereinafter, embodiments are described by using drawings.

Figure 4:
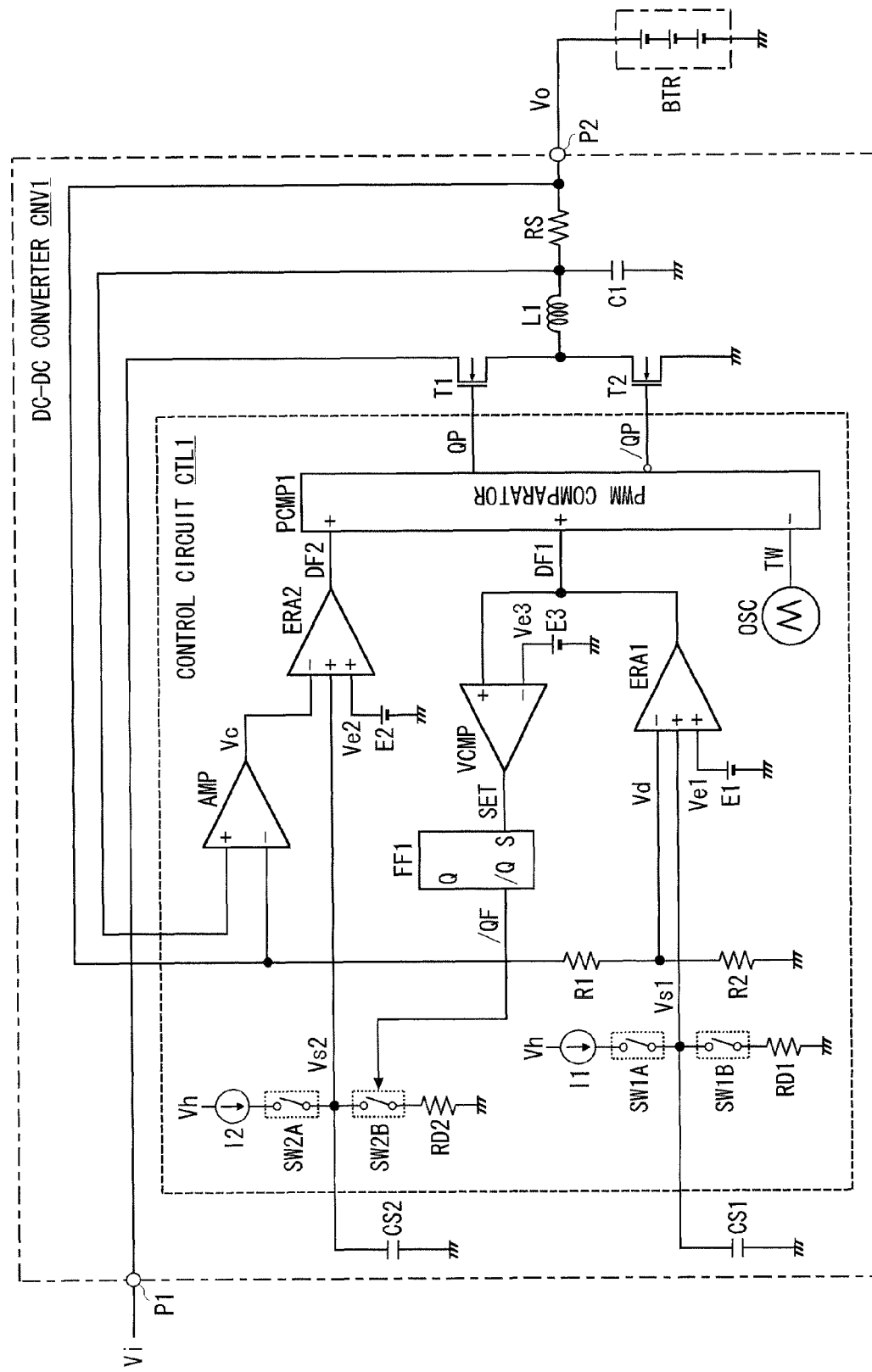
FIG. 4 is an explanatory diagram showing an embodiment.
Figure 5:
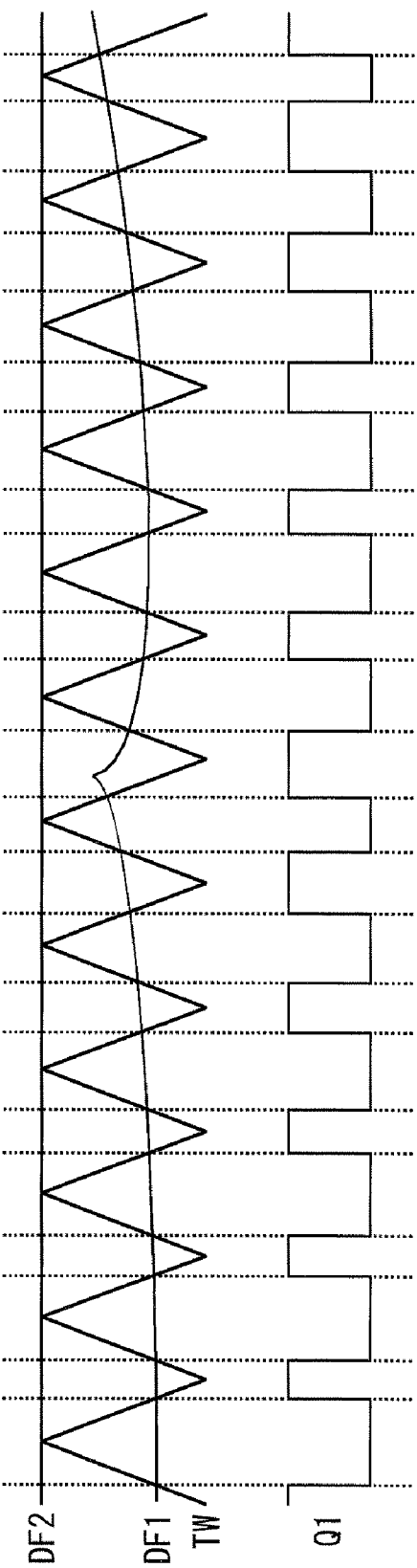
FIG. 5 is an explanatory diagram (at a constant-voltage operation time) showing operations of a PWM comparator in FIG. 4.
Figure 6:
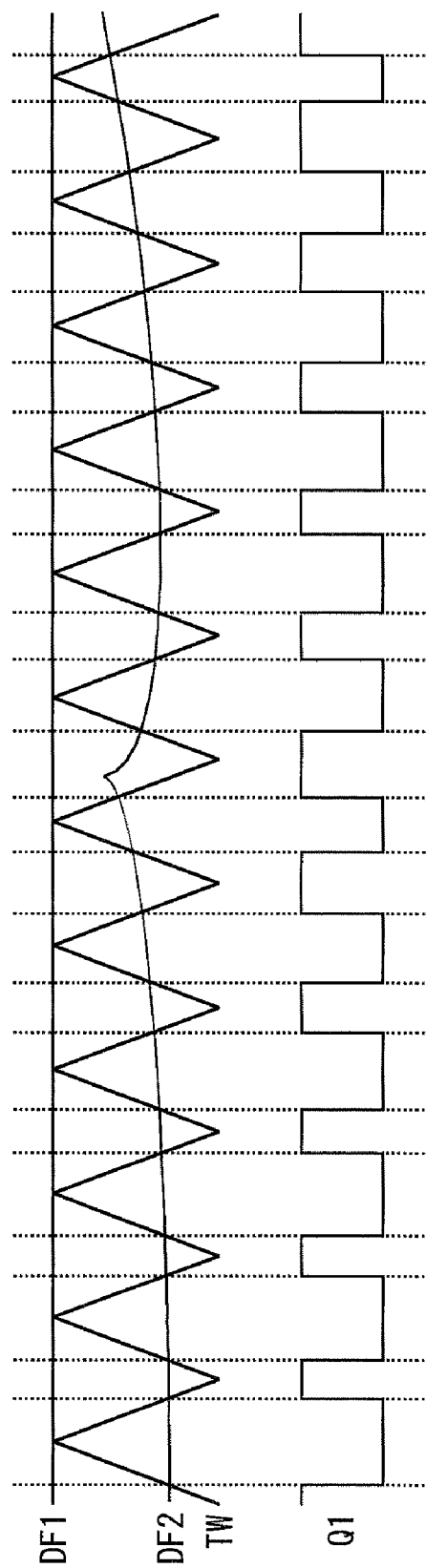
FIG. 6 is an explanatory diagram (at a constant-current operation time) showing the operations of the PWM comparator in FIG. 4.

FIG. 4 shows an embodiment. FIG. 5 and FIG. 6 show operations of a PWM comparator in FIG. 4. Incidentally, before explaining an embodiment, elements which are the same as the elements described in FIG. 1 are designated the same reference numerals used in FIG. 1, and thereby detailed explanations are not given.

Figure 1:
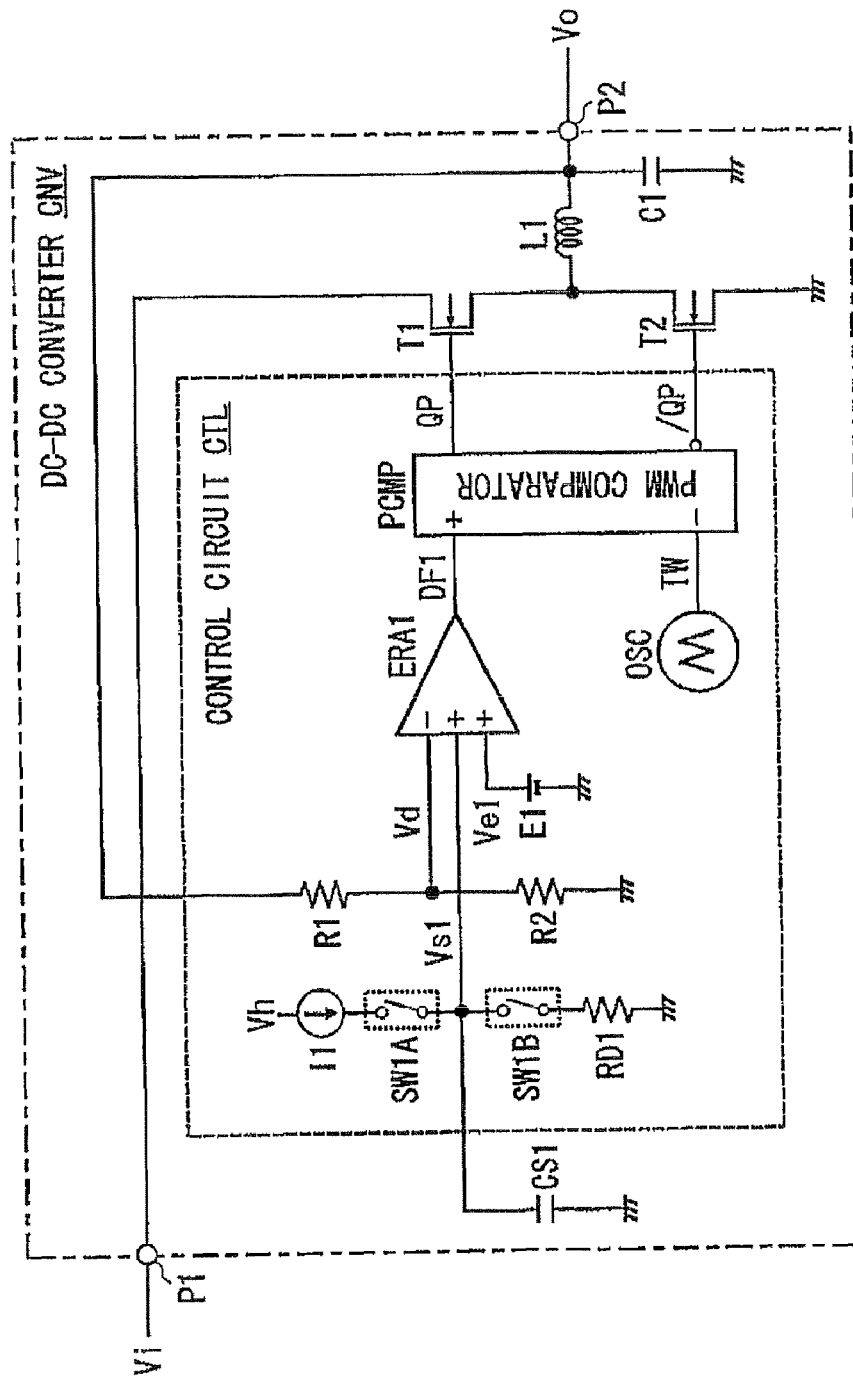
FIG. 1 is an explanatory diagram showing an example of a DC-DC converter.
Figure 2:
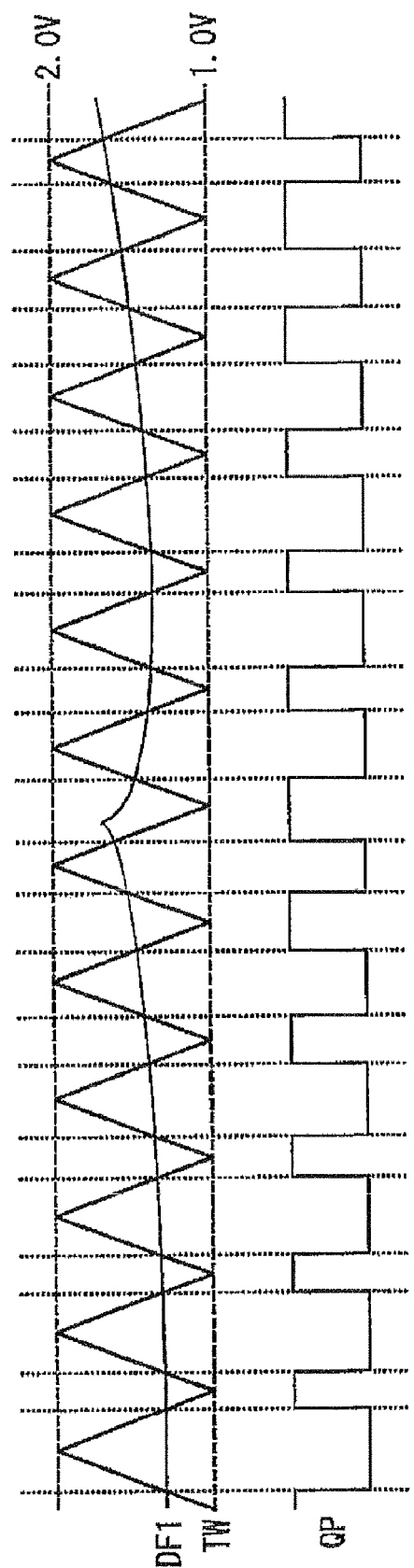
FIG. 2 is an explanatory diagram showing operations of a PWM comparator in FIG. 1.
Figure 3:
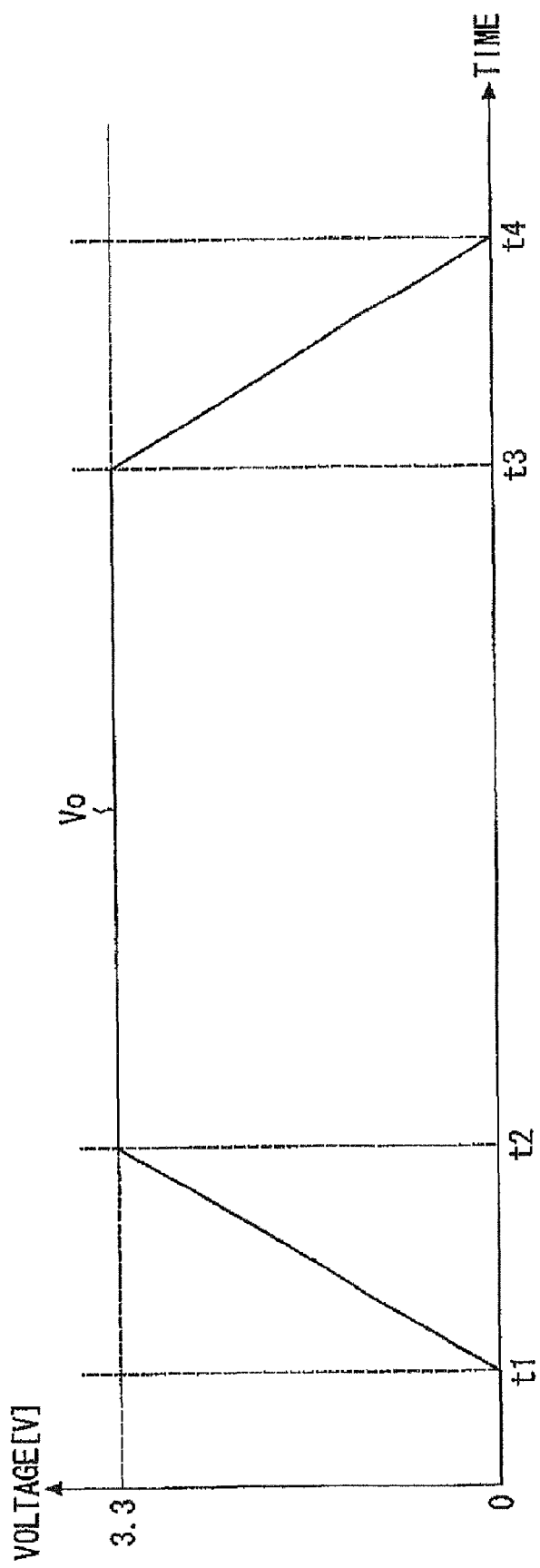
FIG. 3 is an explanatory diagram showing an appearance of rising/failing of an output voltage in the DC-DC converter in FIG. 1.

A DC-DC converter CNV1 of an embodiment is configured as a constant-voltage/constant-current control type DC-DC converter, and configured by adding a current measurement resistor RS and a soft-start capacitor CS2, and replacing the control circuit CTL with a control circuit CTL1 in the DC-DC converter CNV (FIG. 1). For example, the DC-DC converter CNV1 is realized by a semiconductor device, and it is mounted on a portable electronics device as a charging circuit of a secondary battery BTR. The current measurement resistor RS is coupled between the output pin P2 and the other end of the choke coil L1. One end of the soft-start capacitor CS2 is coupled to a second non-inverting input pin between a first and second non-inverting input pins of an error amplifier ERA2 in the control circuit CTL1. The other end of the soft-start capacitor CS2 is coupled to a ground line.

The control circuit CTL1 is configured by adding a voltage amplifier AMP, a constant-current circuit I2, switch circuits SW2A, SW2B, a discharge resistor RD2, voltage generators E2, E3, the error amplifier ERA2, a voltage comparator VCMP, and a flip-flop FF1, and replacing the PWM comparator PCMP with a PWM comparator PCMP1 in the control circuit CTL (FIG. 1). The voltage amplifier AMP receives a voltage of one end of the current measurement resistor RS at a non-inverting input pin, and receives a voltage of the other end of the current measurement resistor RS (output voltage Vo) at an inverting input pin. Accordingly, the voltage amplifier AMP amplifies a voltage difference between the voltage of one end of the current measurement resistor RS and the voltage of the other end of the current measurement resistor RS to generate a voltage Vc. Consequently, the voltage Vc generated by the voltage amplifier AMP corresponds to an output current of the DC-DC converter CNV1.

The constant-current circuit I2 and the switch circuit SW2A are coupled in series between a supply line of the power supply voltage Vh and one end of the soft-start capacitor CS2 (the second non-inverting input pin of the error amplifier ERA2). The switch circuit SW2B and the discharge resistor RD2 are coupled in series between the one end of the soft-start capacitor CS2 (the second non-inverting input pin of the error amplifier ERA2) and the ground line. The switch circuit SW2A turns on-state in response to a start request of the DC-DC converter CNV1, and turns off-state in response to a stop request of the DC-DC converter CNV1 as same as the switch circuit SW1A. The switch circuit SW2B turns on-state when an output signal /QF of the flip-flop FF1 is set at a high level, and turns off-state when the output signal /QF of the flip-flop FF1 is set at a low level. The voltage generator E2 generates a reference voltage Ve2.

The error amplifier ERA2 amplifies a voltage difference between the voltage which is lower between the voltage of the first non-inverting input pin and a voltage of the second non-inverting input pin and a voltage of an inverting input pin to generate an output signal DF2. The error amplifier ERA2 receives the reference voltage Ve2 at the first non-inverting input pin, receives a voltage Vs2 (a voltage of a connection node of the switch circuits SW2A, SW2B) generated by the soft-start capacitor CS2 at the second non-inverting input pin, and receives the voltage Vc generated by the voltage amplifier AMP at the inverting input pin. Consequently, the error amplifier ERA2 generates the output signal DF2 by amplifying the voltage difference between the voltage Vs2 and the voltage Vc when the voltage Vs2 is lower than the reference voltage Ve2, and generates the output signal DF2 by amplifying the voltage difference between the reference voltage Ve2 and the voltage Vc when the voltage Vs2 is higher than the reference voltage Ve2.

The PWM comparator PCMP1 is a voltage-pulse width converter comparing the voltage which is lower between the voltage of the first non-inverting input pin and the voltage of the second non-inverting input pin and the voltage of the inverting input pin, setting the output signal QP (/QP) at a high level (low level) when the voltage of the inverting input pin is lower, and setting the output signal QP (/QP) at a low level (high level) when the voltage of the inverting input pin is higher. The PWM comparator PCMP1 receives the output signal DF1 of the error amplifier ERA1 at a first non-inverting input pin, receives the output signal DF2 of the error amplifier ERA2 at a second non-inverting input pin, and receives the triangular wave signal TW at an inverting input pin.

At the constant-voltage operation time of the DC-DC converter CNV1, the output voltage Vo is in a state near a rated value, and the voltage Vd dividing the output voltage Vo by the resistors R1, R2 is in a state near the reference voltage Ve1. On the other hand, the output current is in a state enough smaller than a rated value, and the voltage Vc amplifying the voltage difference at both ends of the current measurement resistor RS by the voltage amplifier AMP is in a state enough smaller than the reference voltage Ve2. Accordingly, the voltage of the output signal DF2 of the error amplifier ERA2 increases up to a maximum value of the voltage of the triangular wave signal TW. The PWM comparator PCMP1 compares the one having the lower voltage between the output signal DF1 of the error amplifier ERA1 and the output signal DF2 of the error amplifier ERA2, and the triangular wave signal TW, and therefore, the output signal DF2 of the error amplifier ERA2 does not take part in the operation of the PWM comparator PCMP1.

Consequently, at the constant-voltage operation time of the DC-DC converter CNV1, the PWM comparator PCMP1 sets the output signal QP at the high level when the voltage of the output signal DF1 of the error amplifier ERA1 is higher than the voltage of the triangular wave signal TW, and sets the output signal QP at the low level when the voltage of the output signal DF1 of the error amplifier ERA1 is lower than the voltage of the triangular wave signal TW, as shown in FIG. 5. Accordingly, the pulse width of the output signal QP of the PWM comparator PCMP1 becomes small when the voltage of the output signal DF1 of the error amplifier ERA1 becomes low, and the pulse width of the output signal QP of the PWM comparator PCMP1 becomes large when the voltage of the output signal DF1 of the error amplifier ERA1 becomes high. As stated above, at the constant-voltage operation time of the DC-DC converter CNV1, the PWM comparator PCMP1 generates the output signal QP with the pulse width in proportion to the voltage of the output signal DF1 of the error amplifier ERA1.

When the output voltage Vo becomes low, the voltage difference between the reference voltage Ve1 and the voltage Vd (the voltage dividing the output voltage Vo by the resistors R1, R2) becomes large, and the voltage of the output signal DF1 of the error amplifier ERA1 becomes high. As a result, the pulse width of the output signal QP of the PWM comparator PCMS1 becomes large, and the on-term of the main switching transistor T1 becomes long. On the other hand, when the output voltage Vo becomes high, the voltage difference between the reference voltage Ve1 and the voltage Vd becomes small, and the voltage of the output signal DF1 of the error amplifier ERA1 becomes low. As a result, the pulse width of the output signal QP of the PWM comparator PCMP1 becomes small, and the on-term of the main switching transistor T1 becomes short. As stated above, at the constant-voltage operation time of the DC-DC converter CNV1, the output voltage Vo is adjusted by controlling a ratio of the on-term/off-term of the main switching transistor T1.

Besides, at the constant-current operation time of the DC-DC converter CNV1, an output current is in a state near a rated value, and the voltage Vc amplifying the voltage difference between the both ends of the current measurement resistor RS by the voltage amplifier AMP is in a state near the reference voltage Ve2. On the other hand, the output voltage Vo is in the state enough smaller than the rated value, and the voltage Vd dividing the output voltage Vo by the resistors R1, R2 is in the state enough smaller than the reference voltage Ve1. The voltage of the output signal DF1 of the error amplifier ERA1 therefore increases up to a maximum value of the voltage of the triangular wave signal TW. The PWM comparator PCMP1 compares the one having the lower voltage between the output signal DF1 of the error amplifier ERA1 and the output signal DF2 of the error amplifier ERA2, and the triangular wave signal TW, and therefore, the output signal DF1 of the error amplifier ERA1 does not take part in the operation of the PWM comparator PCMP1.

Consequently, at the constant-current operation time of the DC-DC converter CNV1, the PWM comparator PCMP1 sets the output signal QP at the high level when the voltage of the output signal DF2 of the error amplifier ERA2 is higher than the voltage of the triangular wave signal TW, and sets the output signal QP at the low level when the voltage of the output signal DF2 of the error amplifier ERA2 is lower than the voltage of the triangular wave signal TW, as shown in FIG. 6. Accordingly, the pulse width of the output signal QP of the PWM comparator PCMP1 becomes small when the voltage of the output signal DF2 of the error amplifier ERA2 becomes low, and the pulse width of the output signal QP of the PWM comparator PCMP1 becomes large when the voltage of the output signal DF2 of the error amplifier ERA2 becomes high. As stated above, at the constant-current operation time of the DC-DC converter CNV1, the PWM comparator PCMP1 generates the output signal QP with the pulse width in proportion to the voltage of the output signal DF2 of the error amplifier ERA2.

When the output current becomes small, the voltage difference between the reference voltage Ve2 and the voltage Vc (the voltage amplifying the voltage difference between the both ends of the current measurement resistor RS by the voltage amplifier AMP) becomes large, and the voltage of the output signal DF2 of the error amplifier ERA2 becomes high. As a result, the pulse width of the output signal QP of the PWM comparator PCMP1 becomes large, and the on-term of the main switching transistor T1 becomes long. On the other hand, when the output current becomes large, the voltage difference between the reference voltage Ve2 and the voltage Vc becomes small, and the voltage of the output signal DF2 of the error amplifier ERA2 becomes low. As a result, the pulse width of the output signal QP of the PWM comparator PCMP1 becomes small, and the on-term of the main switching transistor T1 becomes short. As stated above, at the constant-current operation time of the DC-DC converter CNV1, the output current is adjusted by controlling the ratio of the on-term/off-term of the main switching transistor T1.

The voltage generator E3 generates a reference voltage Ve3. The voltage comparator VCMP receives the voltage of the output signal DF1 of the error amplifier ERA1 at a non-inverting input pin, and receives the reference voltage Ve3 at an inverting input pin. Accordingly, the voltage comparator VCMP sets an output signal SET at a high level when the voltage of the output signal DF1 of the error amplifier ERA1 is higher than the reference voltage Ve3, and sets the output signal SET at a low level when the voltage of the output signal DF1 of the error amplifier ERA1 is lower than the reference voltage Ve3. The flip-flop FF1 becomes a reset state in response to a start request and a stop request of the DC-DC converter CNV1, and it becomes a set state in response to a rising transition (the transition from the low level to the high level) of the output signal SET of the voltage comparator VCMP. Accordingly, the output signal /QF of the flip-flop FF1 is set at the high level in response to the start request and stop request of the DC-DC converter CNV1, and set at the low level in response to the rising transition of the output signal SET of the voltage comparator VCMP.

When the DC-DC converter CNV1 having the constitution as stated above is started, the switch circuit SW1A turns on-state, the switch circuit SW1B turns off-state, then the soft-start capacitor CS1 is charged by the constant-current circuit I1, and the voltage Vs1 generated by the soft-start capacitor CS1 increases gradually from "0" (zero) V. The voltage Vs1 is supplied to the second non-inverting input pin of the error amplifier ERA1, and therefore, the output voltage Vo is defined by the voltage Vs1 during a period when the voltage Vs1 is lower than the reference voltage Ve1.

Besides, when the DC-DC converter CNV1 is started, the switch circuit SW2A turns on-state and the soft-start capacitor CS2 is charged by the constant-current circuit I2. However, the switch circuit SW2B stays in the on-state because the flip-flop FF1 is initialized into the reset state, and the output signal /QF of the flip-flop FF1 is set at the high level. Accordingly, the voltage Vs2 generated by the soft-start capacitor CS2 is kept in a state near "0" (zero) V. The voltage Vs2 is supplied to the second non-inverting input pin of the error amplifier ERA2, and therefore, the output current is defined by the voltage Vs2 during a period when the voltage Vs2 is lower than the reference voltage Ve2. As a result, the output voltage Vo is controlled to increase gradually from "0" (zero) V, and the output current is controlled to be kept in the state near "0" (zero) A.

When a load of the DC-DC converter CNV1 is the secondary battery BTR, the output voltage Vo increases gradually in accordance with the increase of the voltage Vs1 generated by the soft-start capacitor CS1, but the output current stays at "0" (zero) A. The voltage difference between the both ends of the current measurement resistor RS is "0" (zero) V and the voltage Vc amplifying the voltage difference between the both ends of the current measurement resistor RS by the voltage amplifier AMP is also "0" (zero) V until the output voltage Vo reaches the voltage of the secondary battery BTR even if the voltage Vs1 increases. However, the voltage of the soft-start capacitor CS2 is in the state near "0" (zero) V, and therefore, the output signal DF2 of the error amplifier ERA2 does not take part in the operation of the PWM comparator PCMP1. However, the voltage of the output signal DF2 of the error amplifier ERA2 is in a state near the voltage of the output signal DF1 of the error amplifier ERA1.

When the output voltage Vo increases to be higher than the voltage of the secondary battery BTR, the output current starts flowing, and the charge of the secondary battery BTR is started. The DC-DC converter CNV1 performs the constant-voltage operation, and therefore, the voltage of the output signal DF1 of the error amplifier ERA1 being in charge of the control of the output voltage Vo increases during a period when the voltage Vs1 is lower than the reference voltage Ve1. However, the pulse widths of the output signals QP, /QP of the PWM comparator PCMP1 are limited by the voltage of the output signal DF2 of the error amplifier ERA2 being in charge of the control of the output current, and therefore, the increase of the output voltage Vo is prevented. On the other hand, the voltage Vs1 generated by the soft-start capacitor CS1 increases further, and therefore, the voltage of the output signal DF1 of the error amplifier ERA1 increases rapidly to reach the maximum value of the voltage of the triangular wave signal TW.

When the voltage of the output signal DF1 of the error amplifier ERA1 reaches the maximum value of the voltage of the triangular wave signal TW and becomes higher than the reference voltage Ve3, the output signal SET of the voltage comparator VCMP shifts from the low level to the high level. Accordingly, the flip-flop FF1 becomes the set state, the output signal /QF of the flip-flop FF1 is set at the low level, and therefore, the switch circuit SW2B turns off-state. When the switch circuit SW2B turns off-state, the soft-start capacitor CS2 is charged by the constant-current circuit I2, and the voltage Vs2 generated by the soft-start capacitor CS2 increases gradually. As a result, the output current of the DC-DC converter CNV1 increases gradually from the state near "0" (zero) A to the rated value. Accordingly, the inrush current at the start time of the DC-DC converter CNV1 is prevented.

Figure 7:
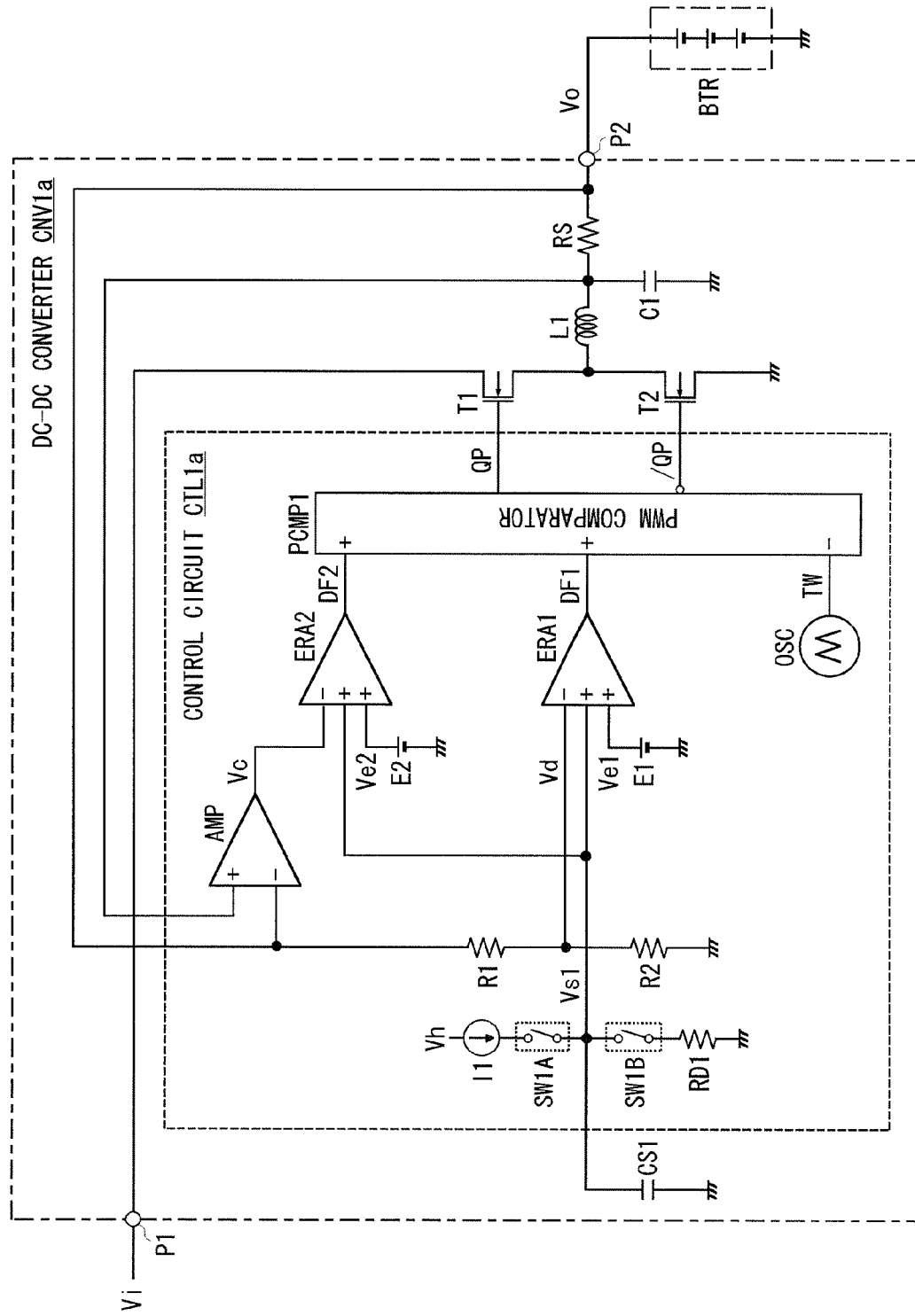
FIG. 7 is an explanatory diagram showing a first comparative example of the embodiment.

FIG. 7 shows a first comparative example of the embodiment. Incidentally, before explaining the first comparative example of the embodiment, elements which are the same as the elements described in the embodiment (FIG. 4) are designated the same reference numerals used in the embodiment, and thereby detailed explanations are not given.

A DC-DC converter CNV1a of the first comparative example of the embodiment is configured by removing the soft-start capacitor CS2, and replacing the control circuit CTL1 with a control circuit CTL1a in the DC-DC converter CNV1 (FIG. 4). Different points from the control circuit CTL1 (FIG. 4) in the control circuit CTL1a are the point in which the constant-current circuit I2, the switch circuits SW2A, SW2B, the discharge resistor RD2, the voltage generator E3, the voltage comparator VCMP, and the flip-flop FF1 are removed, and the point in which the error amplifier ERA2 receives the voltage Vs1 generated by the soft-start capacitor CS1 at the second non-inverting input pin.

When the DC-DC converter CNV1a having the constitution as stated above is started, the switch circuit SW1A turns on-state, the switch circuit SW1B turns off-state, the soft-start capacitor CS1 is charged by the constant-current circuit I1, and the voltage Vs1 generated by the soft-start capacitor CS1 increases gradually from "0" (zero) V. The voltage Vs1 is supplied to the second non-inverting input pin of the error amplifier ERA1, and therefore, the output voltage Vo is defined by the voltage Vs1 during a period when the voltage Vs1 is lower than the reference voltage Ve1. As a result, the output voltage Vo is controlled to increase gradually from "0" (zero) V. Besides, the voltage Vs1 is also supplied to the second non-inverting input pin of the error amplifier ERA2, and therefore, the output current is defined by the voltage Vs1 during a period when the voltage Vs1 is lower than the reference voltage Ve2. As a result, the output current is controlled to increase gradually from "0" (zero) A.

The voltage of the output signal DF1 of the error amplifier ERA1 and the voltage of the output signal DF2 of the error amplifier ERA2 become minimum and the on-term of the main switching transistor T1 becomes minimum, at just after the start of the DC-DC converter CNV1a. Accordingly, the inrush of the current from the input side is prevented. After that, when the voltage Vs1 generated by the soft-start capacitor CS1 increases gradually in accordance with the passage of time, the error amplifier ERA1 operates so as to increase the output voltage Vo gradually, and the error amplifier ERA2 operates so as to increase the output current gradually. When the voltage Vs1 becomes higher than the reference voltage Ve1, the error amplifier ERA1 amplifies the voltage difference between the reference voltage Ve1 and the voltage Vd (the voltage dividing the output voltage Vo by the resistors R1, R2) to generate the output signal DF1. Similarly, when the voltage Vs1 becomes higher than the reference voltage Ve2, the error amplifier ERA2 amplifies the voltage difference between the reference voltage Ve2 and the voltage Vc (the voltage amplifying the voltage difference between the both ends of the current measurement resistor RS by the voltage amplifier AMP) to generate the output signal DF2.

When a load of the DC-DC converter CNV1a is the secondary battery BTR, the output voltage Vo increases gradually in accordance with the increase of the voltage Vs1 generated by the soft-start capacitor CS1, but the output current stays at "0" (zero) A. The voltage difference between the both ends of the current measurement resistor RS by the voltage amplifier AMP is "0" (zero) V even if the voltage Vs1 increases, and the voltage Vc amplifying the voltage difference between the both ends of the current measurement resistor RS is also "0" (zero) V. Accordingly, the voltage of the output signal DF2 of the error amplifier ERA2 also increases, and the output signal DF2 of the error amplifier ERA2 does not take part in the operation of the PWM comparator PCMP1.

When the output voltage Vo increases to be higher than the voltage of the secondary battery BTR, the output current begins to flow, and the charge of the secondary battery BTR is started. The DC-DC converter CNV1a performs the constant-voltage operation, and the voltage of the output signal DF1 of the error amplifier ERA1 increases during a period when the voltage Vs1 is lower than the reference voltage Ve1. Accordingly, the output voltage Vo increases further, and the charging current (output current) of the secondary battery BTR increases rapidly, and thereby, the inrush current is generated.

On the other hand, the voltage of the output signal DF2 of the error amplifier ERA2 is kept at the maximum value of the voltage of the triangular wave signal TW also during this period. However, the voltage difference is generated between the both ends of the current measurement resistor RS resulting from the start of the charge of the secondary battery BTR, and the voltage Vc starts to increase from "0" (zero) V. At this time, the voltage Vs1 generated by the soft-start capacitor CS1 is not "0" (zero) V but in the state reaching the high voltage, and therefore, the voltage of the output signal DF2 of the error amplifier ERA2 does not decrease rapidly even if the output current increases rapidly. The voltage of the output signal DF1 of the error amplifier ERA1 increases also during this period if the voltage Vs1 is lower than the reference voltage Ve1. As a result, the output voltage Vo increases further, the charging current (output current) of the secondary battery BTR increases more rapidly, and thereby, the inrush current is generated.

After this, the voltage of the output signal DF2 of the error amplifier ERA2 decreases in accordance with the increase of the output current, and therefore, the DC-DC converter CNV1a shifts from the constant-voltage operation to the constant-current operation. At this time, the voltage of the output signal DF2 of the error amplifier ERA2 which does not take part in the operation of the PWM comparator PCMP1 is far higher than the voltage of the output signal DF1 of the error amplifier ERA1 which takes part in the operation of the PWM comparator PCMP1, and therefore, the time required for the voltage of the output signal DF2 of the error amplifier ERA2 to become lower than the voltage of the output signal DF1 of the error amplifier ERA1 (a shifting period from the constant-voltage operation to the constant-current operation) becomes very long. During the shifting period from the constant-voltage operation to the constant-current operation, the inrush current is generated continuously because the DC-DC converter CNV1a is in an uncontrolled state. It is therefore necessary to shorten the shifting period from the constant-voltage operation to the constant-current operation. As stated above, in the first comparative example of the embodiment, there is a problem that the uncontrolled state exists for a long period of time until a large-and-small relation between the voltage of the output signal DF1 of the error amplifier ERA1 and the voltage of the output signal DF2 of the error amplifier ERA2 is switched at the start time of the DC-DC converter CNV1a, and the inrush current is generated.

Figure 8:
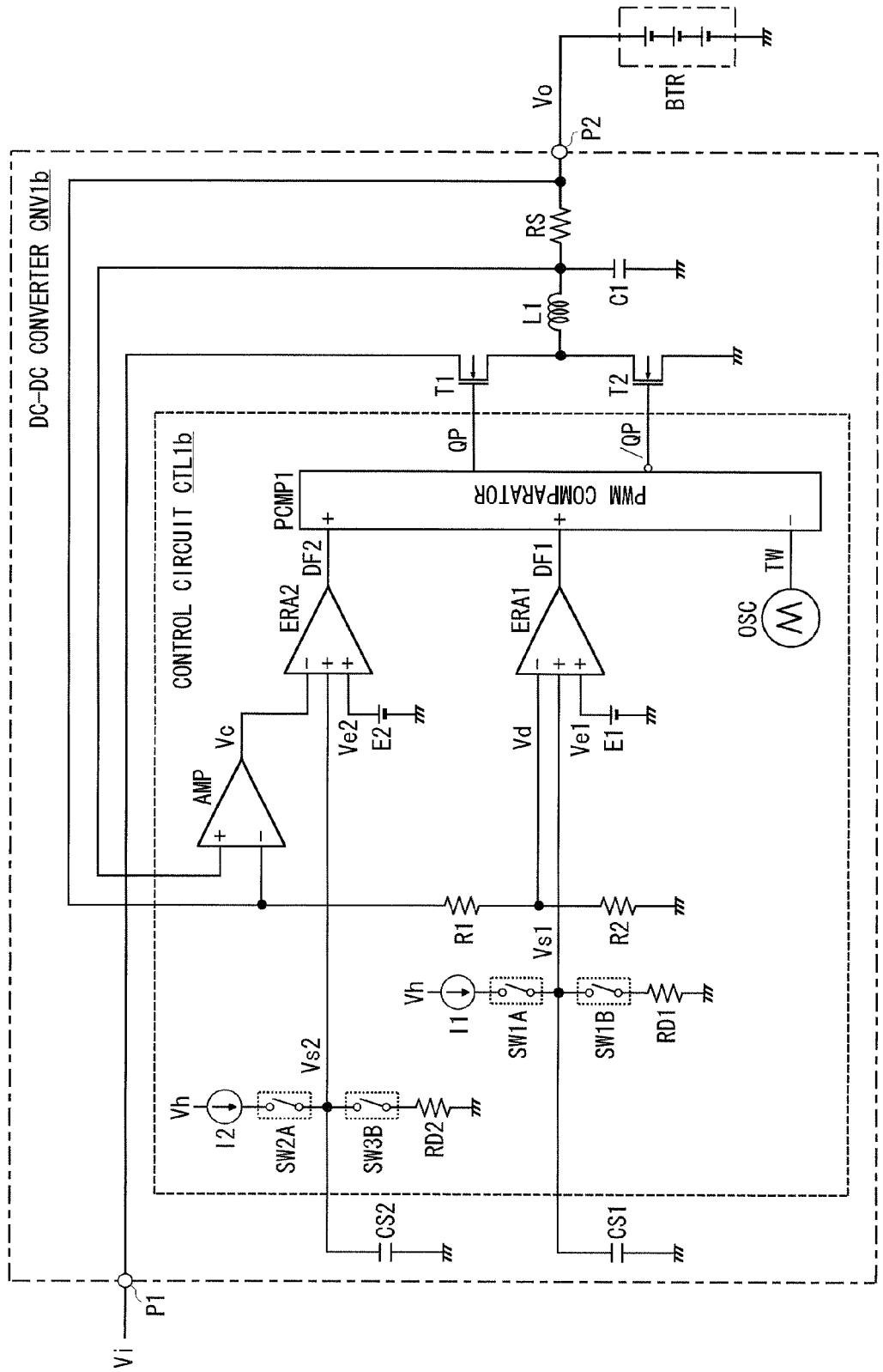
FIG. 8 is an explanatory diagram showing a second comparative example of the embodiment.

FIG. 8 shows a second comparative example of the embodiment. Incidentally, before explaining the second comparative example of the embodiment, elements which are the same as the elements described in the embodiment (FIG. 4) are designated the same reference numerals used in the embodiment, and thereby detailed explanations are not given.

A DC-DC converter CNV1b of the second comparative example of the embodiment is configured by replacing the control circuit CTL1 with a control circuit CTL1b in the DC-DC converter CNV1 (FIG. 4). Different points from the control circuit CTL1 (FIG. 4) in the control circuit CTL1b are the point in which the voltage generator E3, the voltage comparator VCMP, and the flip-flop FF1 are removed, and the point in which a switch circuit SW3B is provided instead of the switch circuit SW2B. The switch circuit SW3B turns on-state in response to a stop request of the DC-DC converter CNV1b, and turns off-state in response to a start request of the DC-DC converter CNV1b, as same as the switch circuit SW1B. The DC-DC converter CNV1b having the constitution as stated above operates as same as the DC-DC converter CNV1a (FIG. 7). Accordingly, there is a problem of the inrush current also in the second comparative example of the embodiment as it is described in the first comparative example of the embodiment.

In the above-stated embodiment, the first soft-start control circuit (the soft-start capacitor CS1 and so on) is provided with corresponding to the error amplifier ERA1, the second soft-start control circuit (the soft-start capacitor CS2 and so on) is provided with corresponding to the error amplifier ERA2, and the second soft-start control circuit is started in accordance with the shift from the constant-voltage operation to the constant-current operation at the start time of the DC-DC converter CNV1. As a result, it is possible to shorten the shifting period from the constant-voltage operation to the constant-current operation, and to surely prevent the inrush current by eliminating the uncontrolled state of the DC-DC converter CNV1.

Incidentally, in the above-stated embodiment, the example is described in which the present embodiment is applied to the DC-DC converter in the switching method. For example, the present embodiment may be applied to a DC-DC converter in a linear regulator method. In the above-stated embodiment, the example is described in which the present embodiment is applied to the step-down type DC-DC converter. For example, the present embodiment may be applied to a step-up type DC-DC converter or a step up/step down type DC-DC converter.

Besides, in the above-stated embodiment, the example is described in which the present embodiment is applied to the DC-DC converter (charging circuit) charging the secondary battery by controlling the voltage at a positive electrode side of the secondary battery. For example, the present embodiment may be applied to a DC-DC converter (charging circuit) charging the secondary battery by controlling the voltage at a negative electrode side of the secondary battery and controlling the voltage applied between the positive and negative electrodes of the secondary battery.

Further, in the above-stated embodiment, the example is described in which the DC-DC converter is realized by the semiconductor device. For example, the DC-DC converter may be realized by a module (a print substrate and so on). In the above-stated embodiment, the example is described in which the present embodiment is applied to the case when the charging circuit using the DC-DC converter and the secondary battery are mounted on the portable electronics device separately. For example, the present embodiment may be applied to the case when a secondary battery pack configured by the charging circuit using the DC-DC converter and the secondary battery is mounted on the portable electronics device.

In the aforementioned embodiment may prevent an inrush current of a DC-DC conversion circuit of which output is controlled by plurality of control signals.

In one aspect of the aforementioned embodiment, a DC-DC conversion circuit (a DC-DC conversion control circuit applied for the DC-DC conversion circuit) of which output is controlled by plurality of control signals is configured by including plurality of control signal generation circuits, plurality of soft-start control circuits, and a start control circuit. For example, the plurality of control signals are configured by a control signal controlling an output voltage to be constant and a control signal controlling an output current to be constant. Besides, for example, the DC-DC conversion circuit is used as a charging circuit charging a secondary battery, and configured by using a semiconductor device.

The plurality of control signal generation circuits are provided with corresponding to the plurality of control signals. Each of the plurality of control signal generation circuits generates a corresponding control signal among the plurality of control signals based on a corresponding output value among plurality of output values (a control signal generation process). The plurality of soft-start control circuits are provided with corresponding to the plurality of control signals. Each of the plurality of soft-start control circuits controls a variation of the corresponding control signal at a start time of the DC-DC conversion circuit (a soft-start control process). The start control circuit instructs the corresponding soft-start control circuit to start operation in accordance with a change of the control signal taking part in an output control at the start time of the DC-DC conversion circuit (a start control process).

For example, each of the plurality of control signal generation circuits is configured by including an error amplifier amplifying a voltage difference between a voltage which is lower between a first and second reference voltages and a voltage obtained from the corresponding output value, to generate a corresponding control signal. Each of the plurality of soft-start control circuits increases the second reference voltage at the corresponding control signal generation circuit from an electric potential lower than the first reference voltage in response to the instruction of the start of operation by the start control circuit.

In the DC-DC conversion circuit as stated above, the soft-start control circuits are provided by every control signal generation circuits, and the corresponding soft-start control circuit starts the operation in accordance with the change of the control signal (the control signal generation circuit) talking part in an output control at the start time of the DC-DC conversion circuit. Accordingly, it is possible to shorten the time required for switching the control signal taking part in the output control at the start time of the DC-DC conversion circuit, and an inrush current is surely prevented by eliminating an uncontrolled state of the DC-DC conversion circuit.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A DC-DC conversion circuit of which output is controlled by a first and a second control signals, comprising:
    a first and a second control signal generation circuits each of which corresponds to each of the first and second control signals, and each of which generates a corresponding control signal of the first and second control signals based on a corresponding output value of a first and a second output values;
    a first and a second soft-start control circuits each of which corresponds to each of the first and second control signals, and each of which controls a variation of the corresponding control signal of the first and second control signals at a start time of the DC-DC conversion circuit; and
    a start control circuit instructing the first soft-start control circuit to start operation in response to a start request of the DC-DC conversion circuit and instructing the second soft-start control circuit to start operation in accordance with a change of a control signal from the first control signal to the second control signal, the control signal taking part in an output control at the start time of the DC-DC conversion circuit, wherein:
    the first output value corresponds to an output voltage and the second output value corresponds to an output current; and
    the first control signal controls the output voltage to be constant and the second control signal controls the output current to be constant.

2. The DC-DC conversion circuit according to claim 1, wherein:
    each of the first and second control signal generation circuits includes an error amplifier amplifying a voltage difference between a voltage which is lower between a first and second reference voltages and a voltage which is obtained from the corresponding output value, and generating the corresponding control signal, and
    each of the first and second soft-start control circuits increases the second reference voltage of the corresponding control signal generation circuit from a voltage lower than the first reference voltage in response to the instruction of the start of operation by the start control circuit.

3. The DC-DC conversion circuit according to claim 1, wherein the DC-DC conversion circuit is used as a charging circuit charging a secondary battery.

4. The DC-DC conversion circuit according to claim 1, wherein the DC-DC conversion circuit is configured by using a semiconductor device.

5. A DC-DC conversion control circuit applied to a DC-DC conversion circuit of which output is controlled by a first and a second control signals, comprising:
    a first and a second control signal generation circuits each of which corresponds to each of the first and second control signals, and each of which generates a corresponding control signal of the first and second control signals based on a corresponding output value of a first and a second output values;
    a first and a second soft-start control circuits each of which corresponds to each of the first and second control signals, and each of which controls a variation of the corresponding control signal of the first and second control signals at a start time of the DC-DC conversion circuit; and
    a start control circuit instructing the first soft-start control circuit to start operation in response to a start request of the DC-DC conversion circuit and instructing the second soft-start control circuit to start operation in accordance with a change of a control signal from the first control signal to the second control signal, the control signal taking part in an output control at the start time of the DC-DC conversion circuit, wherein:
    the first output value corresponds to an output voltage and the second output value corresponds to an output current; and
    the first control signal controls the output voltage to be constant and the second control signal controls the output current to be constant.

6. The DC-DC conversion control circuit according to claim 5, wherein:
    each of the first and second control signal generation circuits includes an error amplifier amplifying a voltage difference between a voltage which is lower between a first and second reference voltages and a voltage which is obtained from the corresponding output value, and generating the corresponding control signal, and
    each of the first and second soft-start control circuits increases the second reference voltage of the corresponding control signal generation circuit from a voltage lower than the first reference voltage in response to the instruction of the start of operation by the start control circuit.

7. A DC-DC conversion control method applied to a DC-DC conversion circuit of which output is controlled by a first and a second control signals, comprising:
    generating a control signal based on a corresponding output value of a first and a second output values as for each of the first and second control signals;
    controlling a variation of the control signal at a start time of the DC-DC conversion circuit as for each of the first and second control signals; and
    instructing a start of the soft-start control process for the first control signal in response to a start request of the DC-DC conversion circuit and instructing a start of the soft-start control process for the second control signal in accordance with a change of the control signal from the first control signal to the second control signal, the control signal taking part in an output control at the start time of the DC-DC conversion circuit, wherein:
    the first output value corresponds to an output voltage and the second output value corresponds to an output current; and
    the first control signal controls the output voltage to be constant and the second control signal controls the output current to be constant.

8. The DC-DC conversion control method according to claim 7, wherein:
    the control signal is generated by amplifying a voltage difference between a voltage which is lower between a first and second reference voltages and a voltage which is obtained from a corresponding output value as for each of the first and second control signals in the control signal generation process, and
    the second reference voltage is increased from a voltage which is lower than the first reference voltage in response to the instruction of the start by the start control process for each of the first and second control signals, in the soft-start control process.

* * * * *